US007026933B2

(12) United States Patent
Kim

(10) Patent No.: US 7,026,933 B2
(45) Date of Patent: Apr. 11, 2006

(54) ANTI-THEFT AND SECURITY SYSTEM FOR COMPUTERS

(76) Inventor: Walter Taehwan Kim, 8226 E. Blackwillow Cir., #202, Anaheim Hills, CA (US) 92808

( * ) Notice: Subject to any disclaimer, the term of this patent is extended or adjusted under 35 U.S.C. 154(b) by 47 days.

(21) Appl. No.: 10/752,266

(22) Filed: Jan. 6, 2004

(65) Prior Publication Data

US 2005/0083200 A1 Apr. 21, 2005

Related U.S. Application Data

(60) Provisional application No. 60/511,472, filed on Oct. 15, 2003.

(51) Int. Cl.
*G08B 1/08* (2006.01)
*G08B 13/12* (2006.01)
*G08B 13/14* (2006.01)
*G06F 15/00* (2006.01)

(52) U.S. Cl. ................ 340/568.1; 340/571; 340/572.1; 340/572.3; 340/572.9; 340/568.2; 340/539.1; 702/141

(58) Field of Classification Search ............. 340/568.1, 340/568.2, 568.4, 571, 572.1, 539, 384.1, 340/384.6, 539.15, 572.3; 702/141
See application file for complete search history.

(56) References Cited

U.S. PATENT DOCUMENTS

| | | | | | |
|---|---|---|---|---|---|
| 5,317,304 | A | * | 5/1994 | Choi | 340/571 |
| 6,133,830 | A | * | 10/2000 | D'Angelo et al. | 340/571 |
| 6,137,409 | A | * | 10/2000 | Stephens | 340/568.1 |
| 6,172,607 | B1 | * | 1/2001 | McDonald | 340/571 |
| 6,459,374 | B1 | * | 10/2002 | Rand et al. | 340/568.2 |
| 2005/0033546 | A1 | * | 2/2005 | Hamaguchi et al. | 702/141 |

* cited by examiner

*Primary Examiner*—Jeffery Hofsass
*Assistant Examiner*—Lam Pham

(57) ABSTRACT

A system is disclosed for preventing an unauthorized person from moving or stealing electronic devices having one or more USB ports, such as portable computers. The anti-theft system includes a USB device capable of connecting to a USB port of a computer and an alarm sub-system to cause an audible alarm to be generated based on a signal generated within the USB device.

20 Claims, 5 Drawing Sheets

ANTI-THEFT AND SECURITY SYSTEM FOR COMPUTERS

CROSS-REFERENCE TO RELATED APPLICATION

This application claims the benefit of priority to U.S. Provisional Patent Application Ser. No. 60/511,472, filed Oct. 15, 2003, which is incorporated herein, in its entirety, by reference.

BACKGROUND

1. Field

Embodiments relate to anti-theft and/or security system for electronic devices, such as portable and non-portable computers.

2. Background

Various anti-theft devices have been proposed to prevent the theft of electronic devices, such as portable and non-portable computers. For example, a combination of a cable and a lock may be used to prevent theft of a portable computer by anchoring the portable computer to a structure that cannot be easily moved. As another example, a portable anti-theft device containing a motion sensor may be used to prevent theft of a portable computer by securely attaching the anti-theft device to the portable computer using a combination of a cable and a lock. When the anti-theft device is activated, the motion sensor incorporated within the portable anti-theft device triggers an audible alarm signal in response to movement of the portable computer to which the anti-theft device is attached.

There are a number of disadvantages associated with the above-described devices. For one thing, each time a user needs to set up the portable computer at another location, the user must manually attach the above-described devices to the portable computer using a cumbersome cable and lock combination. One of the major benefits of having a portable computer is that it can be easily carried to many locations and it can be easily set up at the selected locations. Therefore, extra efforts required in manually attaching such anti-theft devices to a portable computer using a cable and lock combination decrease the usefulness of the portable computer and/or the desirability of using such anti-theft devices.

SUMMARY

In accordance with one embodiment of the present invention, a system is described for preventing an unauthorized person from moving or stealing electronic devices having one or more USB ports, such as portable computers. The anti-theft system includes a USB device capable of connecting to a USB port of a computer and an alarm sub-system to cause an audible alarm to be generated based on a signal generated within the USB device.

BRIEF DESCRIPTION OF THE DRAWINGS

The invention is illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

DETAILED DESCRIPTION

In the following description, specific details are set forth in order to provide a thorough understanding of the present invention. However, it will be apparent to one skilled in the art that the present invention may be practiced without these specific details. In other instances, well-known hardware and software components, structures and techniques have not been shown in detail in order to avoid obscuring the present invention.

Figure 1:
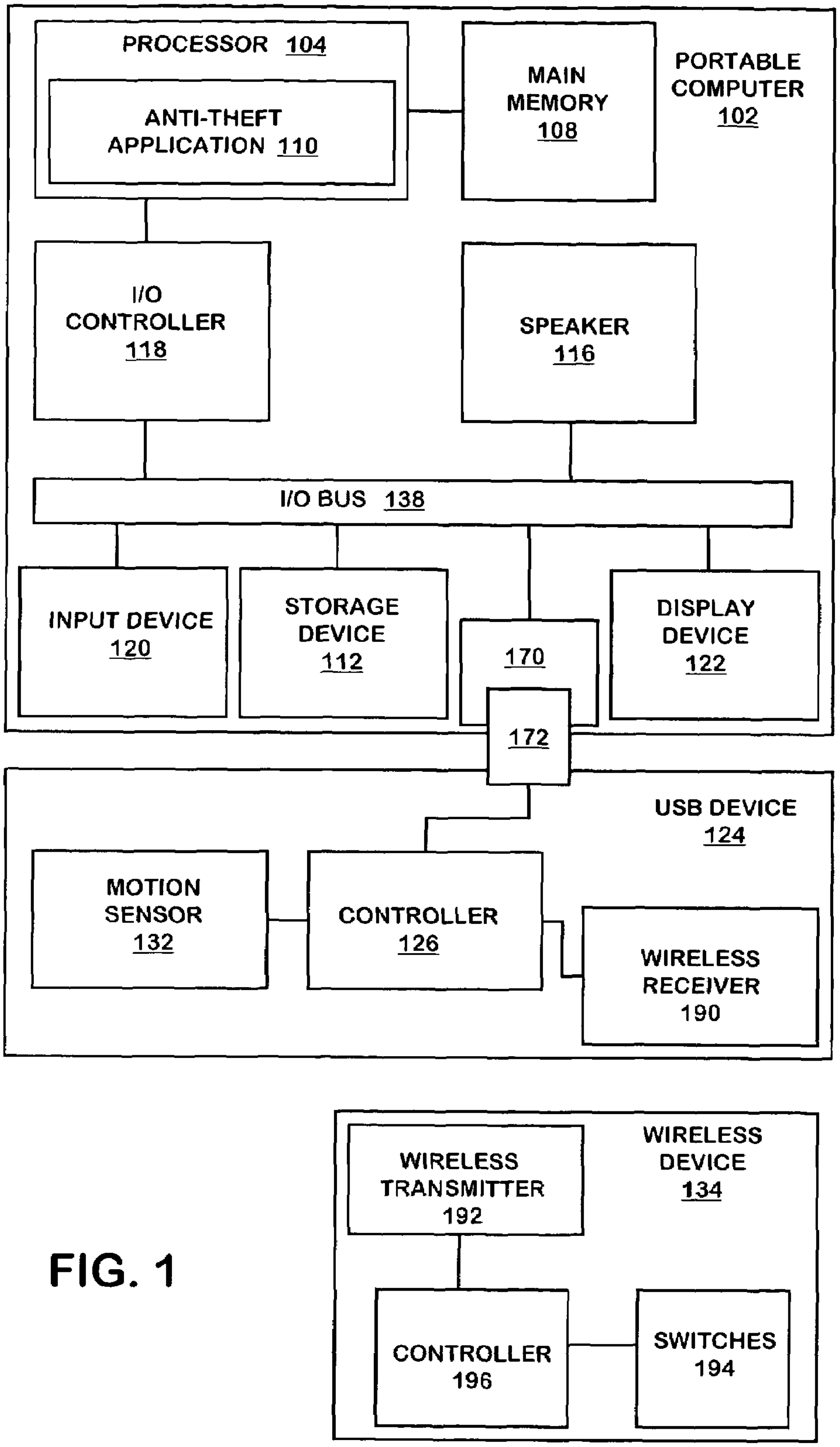
FIG. 1 shows a block diagram of an anti-theft system for a computer according to one embodiment of the invention.

FIG. 1 is a block diagram of an anti-theft system for a computer according to one embodiment of the invention. Illustrated in FIG. 1 is an example of a computer 102 to which the anti-theft system according to one embodiment of the invention may be implemented. In one embodiment the anti-theft system is used to prevent theft of a portable computer 102. However, it should be noted that the anti-theft system may also be used with non-portable computers. The portable computer 102 includes a processor 104 coupled to a main memory 108 and a number of I/O devices coupled to an I/O controller 118 via an I/O bus 118. The I/O devices may include input devices, such as a keyboard and a pointing device 120, a storage device 112 (e.g., hard disk drive), a display device 122 and a speaker 116.

In one embodiment, the anti-theft system uses a removable USB device 124 coupled to the portable computer 102 to detect a possible unauthorized taking of the portable computer. In one embodiment, the USB device is capable being removably coupled to an external USB port of a computer. In the illustrated embodiment, the USB device includes a wireless receiver 190 capable of receiving wireless signals. In one embodiment, the USB device 124 includes an enclosure that contains a controller 126 and a connector 172 to connect the USB device 124 to a USB (Universal Serial Bus) port 170 of the computer 102. In use, the controller 126, located within the enclosure, may communicate with the portable computer 102 to enable and disable an alarm sub-system implemented by the computer, based on a wireless signal received by the wireless receiver 190. In one embodiment, the connector 172 of the USB device 124 is fixedly and directly connected to the enclosure of the USB device. In one embodiment, when the USB device 124 is coupled to the computer, the enclosure of the USB device is disposed external to the computer.

In one embodiment, the anti-theft system is configured to trigger an audible alarm based on a signal generated within the USB device 124. In one embodiment, the USB device 124 includes a motion sensor 132 to enable detection of the movement thereof. The motion sensor 132 may comprise a mercury switch, a piezoresistive switch, an accelerometer, a gyroscope, an angle sensor or any other mechanism sensitive to displacement motion and/or angular motion. The motion sensor 132 is electronically coupled to the controller 126. When the USB device 124 connected to the portable computer 102 is moved by a person, the controller 126 in conjunction with the motion sensor 132 will generate a motion signal indicating that the USB device 124 is being moved from a stationary position.

The anti-theft system also includes an alarm sub-system to cause an audible alarm to be generated if a movement of the USB device 124 is detected while the alarm sub-system is enabled. In one embodiment, the alarm sub-system is implemented within the computer. In one embodiment, the alarm sub-system comprises an anti-theft application 110 executed within the portable computer 102, which causes the speaker to sound an audible alarm when certain conditions are satisfied. More specifically, the anti-theft application 110 running in the portable computer is in communication with the USB device 124 and uses a signal generated within the USB device 124 to determine if an audible alarm needs to be activated and/or deactivated. In one embodiment, the anti-theft application 110 running in the portable computer 102 is configured to cause the speaker 116 to produce an audible alarm in response to the motion signal generated by the motion sensor 132 while the alarm sub-system is enabled.

In one embodiment, the anti-theft system is capable of determining if the USB device 124 has been unplugged from the portable computer 102. This may be accomplished in a number of different ways. For example, the unplugging of the USB device 124 may be recognized by the anti-theft application 110 when a communication with the USB device cannot be established. As another example, the unplugging of the USB device 124 may be recognized by the operating system running in the computer and this information may be communicated from the operating system to the anti-theft application 110. In one embodiment, the anti-theft system is configured to cause the audible alarm to be generated if it detects that the USB device 124 has been unplugged from the portable computer 102 while the alarm sub-system is enabled.

In one embodiment, the anti-theft system includes a user-interface to allow a user to enable and disable the alarm sub-system. In one embodiment, the anti-theft system includes a wireless device 134 having a wireless transmitter 192 for transmitting wireless signals to the USB device 124. The anti-theft system is configured such that the alarm sub-system can be enabled and/or disabled by using the switches 194 provided on the wireless device 134. The wireless signal transmitted by the wireless device 134 is received by the wireless receiver 190 of the USB device 124 and is processed by the controller 126 located within the USB device. The controller 126 of the USB device 124 is in communication with the anti-theft application 110 and is configured to enable and disable an alarm sub-system implemented by the computer, based on a wireless signal received by the wireless receiver 190.

Figure 2:
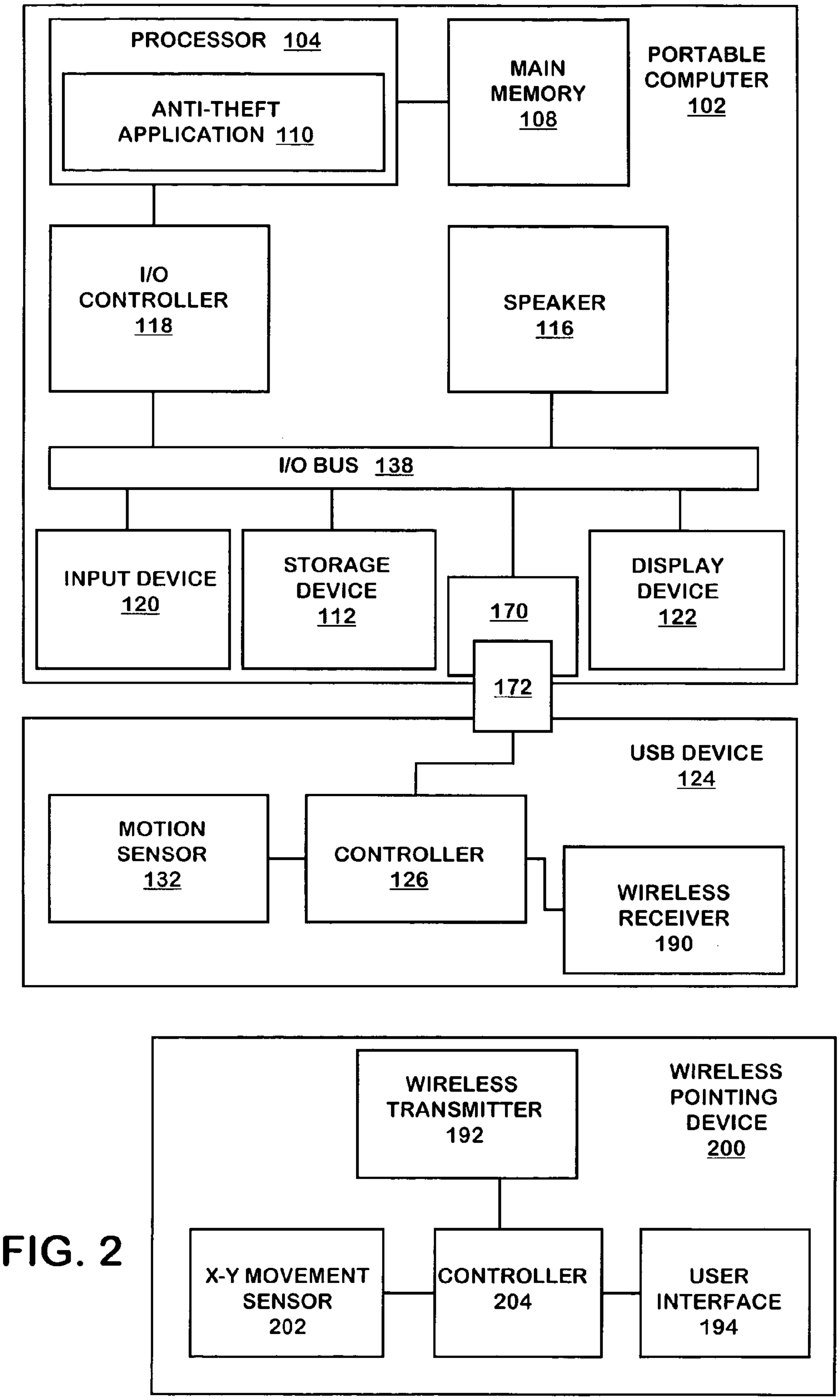
FIG. 2 shows a block diagram of an anti-theft system for a computer according to another embodiment of the invention.

In another embodiment, the wireless device to enable a user to enable and disable the alarm sub-system is embodied in a form of a wireless pointing device 200, as shown in FIG. 2. The term "pointing device" is used to describe a computer input device that may be used, for example, for positioning a cursor on a computer video display. In one embodiment, the wireless pointing device 200 includes an enclosure that lies flat on a support surface and one or more user-actuated switches or buttons 194 located externally of the enclosure, a X-Y movement sensor 202, a controller 204 and a wireless transmitter 192 to enable wireless communication with the USB receiver device 124. In use, the controller 204, located within the enclosure, convert the X and Y movement of the pointing device 200 and switch information into digital information, which is supplied to the portable computer 102. Software running in the portable computer 102 uses the motion and switch information to perform various functions, for example, repositioning the cursor on the computer display screen 122. In this embodiment, the user interface 194 provided on the wireless pointing device 200 may be used by a user to enable and disable the alarm-subsystem. In one embodiment, the user interface 194 provided on the pointing device includes a numeric keypad and a small LCD display provided on the enclosure of the pointing device. In this regard, the alarm sub-system can be enabled and/or disabled by enter a predefined code using the numeric keypad provided on the pointing device. In another embodiment, the alarm sub-system may be enabled or disabled by using the conventional pointing device buttons provided on the pointing device.

Figure 3:
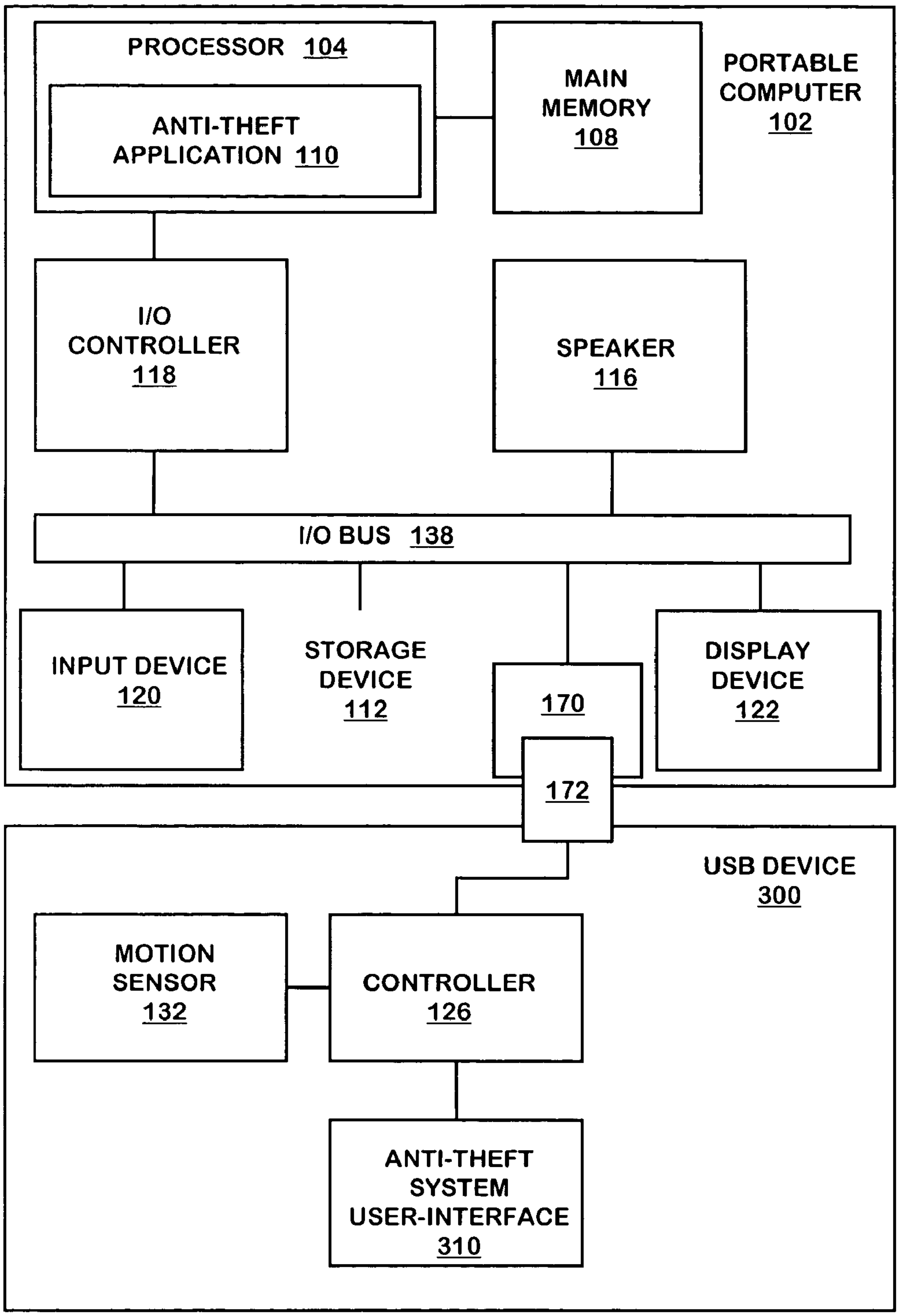
FIG. 3 shows a block diagram of an anti-theft system for a computer according to yet another embodiment of the invention.

In yet another embodiment, a user-interface 310 for enabling and disabling the alarm sub-system is provided on the enclosure of the USB device 300, as shown in FIG. 3. In one embodiment, the user-interface 310 may be embodied in a form of a numeric keypad and a small LCD display provided on the enclosure of the USB device 300. In this regard, the alarm sub-system can be enabled and/or disabled by enter a predefined code using the numeric keypad provided on the USB device.

Figure 4:
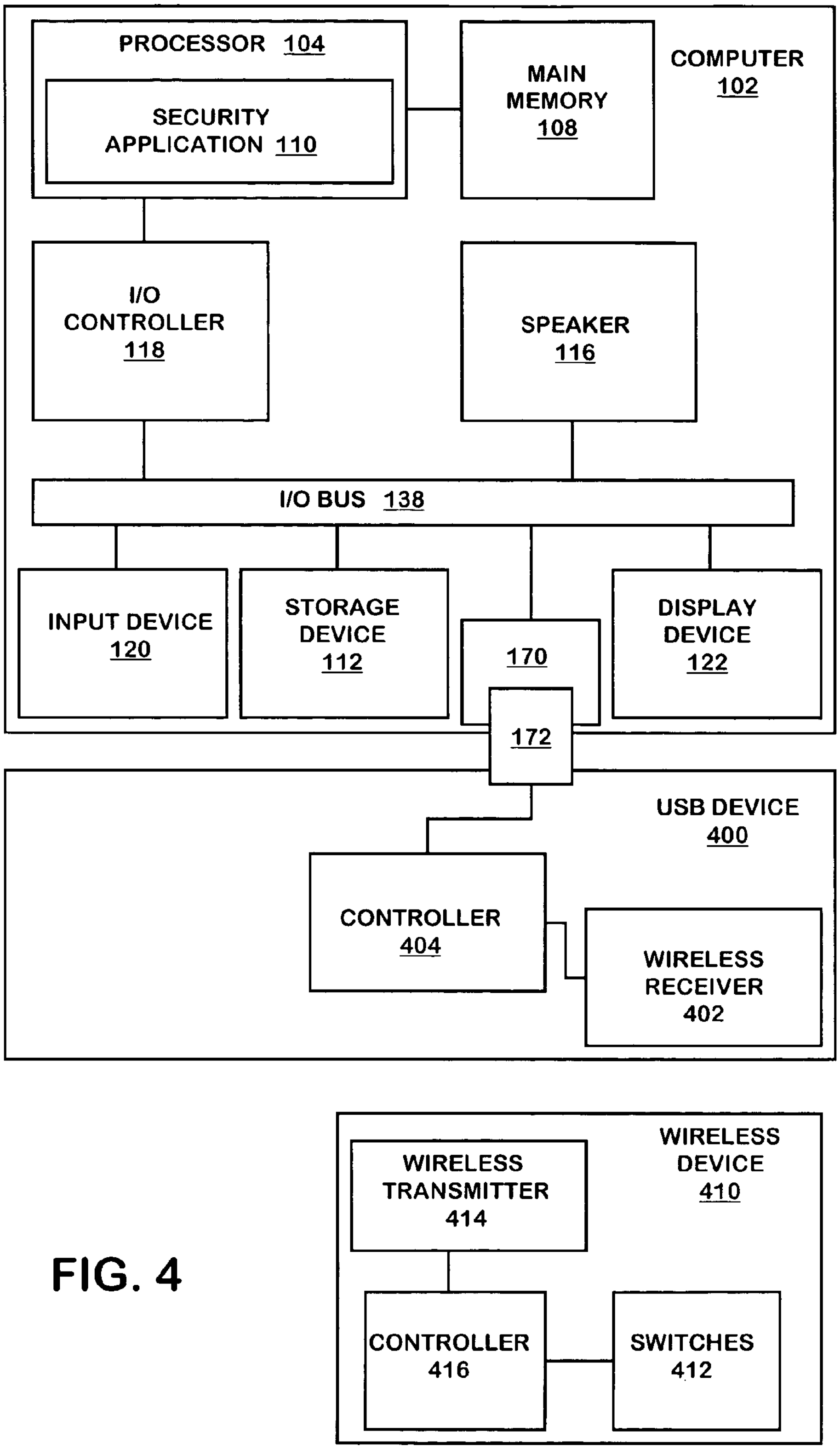
FIG. 4 shows a block diagram of a security system for a computer according to one embodiment of the invention.

FIG. 4 shows a block diagram of a security system for a computer according to one embodiment of the invention. In this embodiment, the security application 110 is capable of detecting when someone tries to access the computer. A security sub-system of the computer may be enabled and disabled using the wireless device 410 and the USB device 400 coupled to the computer. In use, when someone tries to access the computer while the security sub-system is enabled, the security application 110 executed within the computer will generate an audible alarm or a warning (either visually or audibly) to indicate that the security sub-system is turned on and that nobody can access the computer unless the alarm sub-system is properly turned off. Accordingly, the security application 110 will prevent any person from access a portion or entire portion of the storage device 112 of the computer when the security sub-system is turned on. This embodiment provide a simple way to turn on and off a security system implemented by the computer by using the USB wireless receiver device 400 and a wireless remote control device 410.

Figure 5:
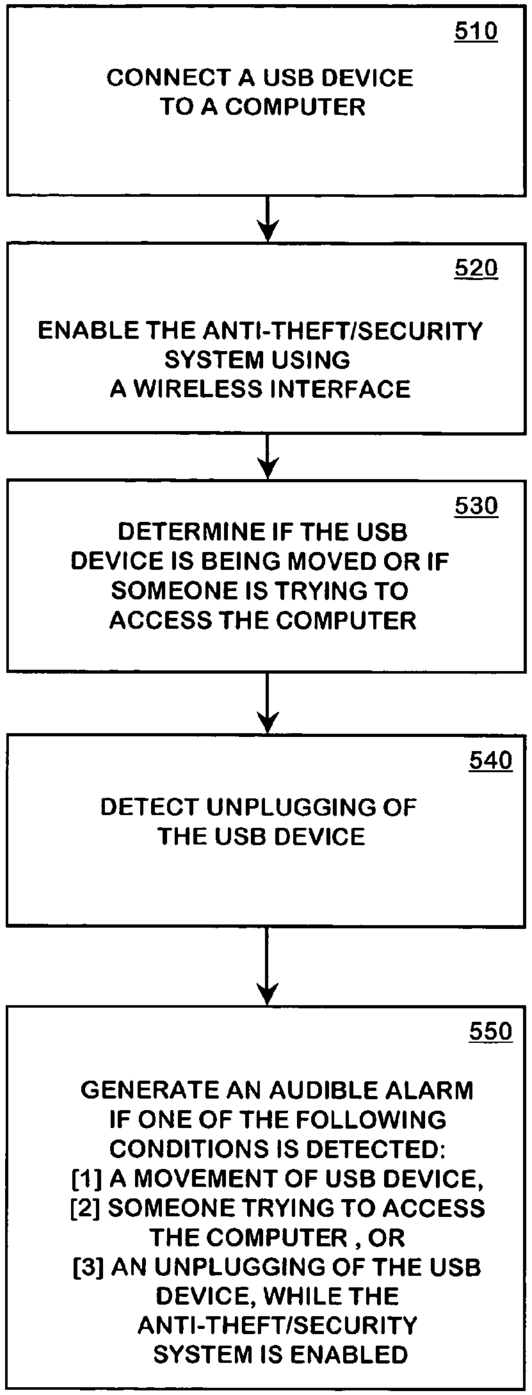
FIG. 5 shows a flowchart diagram illustrating a method of preventing an unauthorized person from moving or stealing a portable computer according to one embodiment of the invention.

FIG. 5 shows a flowchart diagram illustrating a method of preventing an unauthorized person from moving or stealing a portable computer according to one embodiment of the invention. In block 510, a user sets up a portable computer by connecting a USB device to the portable computer. When the user has to leave the portable computer unattended, the user may interact with a user interface to enable an anti-theft/security system incorporated within the portable computer and/or the USB device in block 520. In one embodiment, the anti-theft/security system is enabled by using a wireless transmitter device to communicate with a wireless receiver incorporated within the USB device. The anti-theft/security system may comprise an application program running in the portable computer, which is in communication with the USB device. In accordance with one aspect of one embodiment, the anti-theft/security system causes an audible sound to be generated based on a signal generated within the USB device. In one embodiment, the anti-theft/security system is capable of detecting a movement of the USB device, detecting when someone tries to access the computer and/or detecting unplugging of the USB device. Accordingly, in block 530, the anti-theft/security system determines if the USB device is being moved or if someone is trying to access the computer. Additionally, in block 540, the anti-theft/security system determines if the USB device has been unplugged from the portable computer. Then in block 550, the anti-theft/security system generates an audible alarm or a warning [1] if the movement of the USB device is detected, [2] if someone tries to access the computer, or [3] if the unplugging of the USB device is detected, while the anti-theft/security system is enabled. When the user is ready to use the portable computer again, the user may disable the anti-theft/security system via the wireless transmitter device.

In one embodiment, the anti-theft/security system prevents turning off or rebooting of the computer when the anti-theft/security system is enabled. In one embodiment, the anti-theft/security system prevents unauthorized use of the computer (e.g., prevents others from accessing the hard drive) when the anti-theft/security system is enabled.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:

a motion detecting device capable of connecting to an external port of a computer, the motion detecting device including a wireless receiver capable of receiving wireless signals, the motion detection device capable of enabling and disabling an alarm system executed by the computer based on a wireless signal received by the wireless receiver; and wherein an audible alarm is generated by the computer to which the motion detecting device is connected based on a signal generated within the motion detecting device.

2. The system of claim 1, wherein the motion detecting device is capable of connecting to a USB (Universal Serial Bus) port of a computer.

3. The system of claim 2, wherein the alarm system causes the audible alarm to be generated if a movement of the motion detecting device is detected while the alarm system is enabled.

4. The system of claim 1, wherein the motion detecting device includes a motion sensor to generate a motion signal indicating that the motion detecting device is being moved.

5. The system of claim 4, wherein the alarm system comprises an application executed in the computer, the application in communication with the motion detecting device and causes a speaker in the computer to produce an audible alarm in response to the motion signal generated by the motion sensor.

6. The system of claim 1, wherein the alarm system causes the audible alarm to be generated by the computer if the motion detecting device is unplugged from the computer while the alarm system is enabled.

7. The system of claim 1, further comprising:

a user-interface to enable and disable the alarm system, wherein the user-interface is provided on the motion detecting device.

8. The system of claim 7, wherein the motion detecting device is capable of receiving wireless signals, and the user-interface is incorporated within a wireless device capable of transmitting wireless signals.

9. The system of claim 8, wherein the wireless device includes at least one switch for enabling and disabling the alarm system.

10. The system of claim 8, wherein the wireless device is a wireless pointing device.

11. The system of claim 7, wherein the user-interface comprises a keypad to enable and disable the alarm system by entering a predefined code and a display to indicate whether or not the alarm system is enabled.

12. The system of claim 1, wherein the alarm system is incorporated within the motion detecting device.

13. The system of claim 12, wherein the alarm system causes the audible alarm to be generated by the motion detecting device if the motion detecting device is unplugged from the computer while the alarm system is enabled.

14. A method comprising:

removably connecting a motion detecting device to an external port of a computer;

enabling an anti-theft system using a wireless transmitter to communication with a wireless receiver incorporated within the motion detecting device; and causing an audible sound to be generated by the computer based on a signal generated within the motion detecting device when a movement of the motion detecting device is detected.

15. The method of claim 14, wherein connecting the motion detecting device to the computer comprises connecting to a USB port of the computer.

16. The method of claim 14, further comprising:

detecting movement of the motion detecting device; and generating the audible sound if the movement of the motion detecting device is detected while the anti-theft system is enabled.

17. The method of claim 16, further comprising:

detecting unplugging of the motion detecting device; and generating the audible sound by the computer if the unplugging of the motion detecting device is detected while the anti-theft system is enabled.

18. An apparatus comprising:

an enclosure;

a wireless receiver contained in the enclosure to receive wireless signals;

a motion sensor contained in the enclosure to enable detection of movement of the enclosure;

a connector coupled to the enclosure to connect to an external port of a computer; and a controller contained in the enclosure and coupled to the wireless receiver and the motion sensor, the controller to generate a motion signal indicating that the enclosure is being moved, wherein an audible alarm is generated by the computer based on the motion signal generated by the controller.

19. The apparatus of claim 18, wherein the connector is configured to removably connect to a USB port of a portable computer.

20. The apparatus of claim 18, wherein the controller capable of generating an enable signal to enable an alarm system executed by the computer.

* * * * *